US012642384B1

(12) United States Patent
Orr

(10) Patent No.: US 12,642,384 B1
(45) Date of Patent: Jun. 2, 2026

(54) BREWING SYSTEM FOR LIQUIDS SUCH AS COFFEE

(71) Applicant: Timothy E. Orr, Redding, CA (US)

(72) Inventor: Timothy E. Orr, Redding, CA (US)

(73) Assignee: TORR INDUSTRIES, INC., Redding, CA (US)

( * ) Notice: Subject to any disclaimer, the term of this patent is extended or adjusted under 35 U.S.C. 154(b) by 766 days.

(21) Appl. No.: 17/515,168

(22) Filed: Oct. 29, 2021

(51) Int. Cl.
| | |
|---|---|
| *A47J 31/20* | (2006.01) |
| *A47J 31/00* | (2006.01) |
| *A47J 31/06* | (2006.01) |
| *A47J 31/44* | (2006.01) |
| *A47J 31/52* | (2006.01) |
| *B01D 39/10* | (2006.01) |
| *B32B 5/02* | (2006.01) |
| *B32B 5/26* | (2006.01) |

(52) U.S. Cl.
CPC ............. *A47J 31/20* (2013.01); *A47J 31/007* (2013.01); *A47J 31/06* (2013.01); *A47J 31/4407* (2013.01); *A47J 31/525* (2018.08); *B01D 39/10* (2013.01); *B32B 5/024* (2013.01); *B32B 5/263* (2021.05); *A47J 2203/00* (2013.01); *B01D 2239/0613* (2013.01); *B01D 2239/0654* (2013.01); *B01D 2239/1291* (2013.01)

(58) Field of Classification Search
CPC .... A47J 31/56; A47J 31/4457; A47J 31/0605; A47J 31/462; A47J 31/20
See application file for complete search history.

(56) References Cited

U.S. PATENT DOCUMENTS

| | | | | |
|---|---|---|---|---|
| 3,446,137 | A * | 5/1969 | Modjeski | G07F 13/065 |
| | | | | 99/289 R |
| 4,757,752 | A * | 7/1988 | Robins | A47J 31/002 |
| | | | | 99/279 |
| 8,286,547 | B1* | 10/2012 | Lassota | A23F 5/18 |
| | | | | 99/283 |
| 10,765,137 | B1* | 9/2020 | Hart | A23N 12/08 |
| 10,820,748 | B1* | 11/2020 | Garcia | A47J 31/52 |
| 2002/0148357 | A1* | 10/2002 | Lazaris | A47J 31/3633 |
| | | | | 99/302 R |
| 2002/0164781 | A1* | 11/2002 | Alms | C05F 17/40 |
| | | | | 435/296.1 |
| 2017/0007065 | A1* | 1/2017 | Bombeck | A47J 31/24 |
| 2017/0251865 | A1* | 9/2017 | Clark | A47J 31/56 |
| 2017/0273499 | A1* | 9/2017 | Yeh | A47J 31/02 |
| 2017/0367526 | A1* | 12/2017 | Avins | A47J 31/5253 |
| 2018/0289198 | A1* | 10/2018 | Scholtens | A47J 31/02 |
| 2019/0261643 | A1* | 8/2019 | Buerger | A47J 31/4403 |

OTHER PUBLICATIONS

W.S. Tyler. What is Porostar? (Product overview, Price, Industry Uses) Apr. 14, 2021, Youtube. time 1:27-1:40. (Year: 2021).*

* cited by examiner

*Primary Examiner* — Steven W Crabb
*Assistant Examiner* — Spencer H. Kirkwood
(74) *Attorney, Agent, or Firm* — Theodore J. Bielen, Jr.

(57) ABSTRACT

A beverage steeping apparatus utilizing a vessel having a chamber. A screen unit having three layers is employed to hold essence containing substances for the purpose of brewing beverages. A water dispersing element delivers water to the screen units within the vessel chamber. The steeped beverages are pumped to a storage unit for use.

5 Claims, 6 Drawing Sheets

BREWING SYSTEM FOR LIQUIDS SUCH AS COFFEE

BACKGROUND OF THE INVENTION

Beverages, such as coffee and tea, are usually steeped or brewed, by causing hot water to pass through the coffee grounds or tea leaves which are located in a filter. Filters can take a form of paper filters or screens. Used solid particles such as coffee grounds or tea leaves are then disposed of. Also, the paper filter is gotten rid of and the filter screen is cleaned.

Although hot water is normally used to brew or steep hot coffee, the cold brewing of coffee has become popular in recent past. Cold brewing produces a coffee beverage that possesses no acidity, as is found in conventional hot brewing produced coffee.

When coffee, tea or other beverages are brewed using hot or cold water, a problem exists in the disposal of the used finely divided materials, such as coffee grounds and tea leaves, after the production of the coffee. Also, the steeping of coffee grounds in large quantities is normally a very slow process due to clogging by the wet grounds.

In the past, there have been numerous devices and methods used to brew tea and coffee. For example, U.S. Pat. Nos. 10,674,862, 7,032,507, and US Patent Application. Application 20184/0078078 show coffee brewing apparatuses using mesh filters in which coffee is produced by flipping or tilting a container.

U.S. Pat. Nos. 9,993,011, 9,999,314, 10,729,275, and United States Patent Application 20204/0268196 describe devices and methods for producing cold brewing coffee. These references commonly use coffee grounds formed into a cake which is placed on a filter that is normally a mesh filter.

U.S. Pat. No. 9,961,917 shows a cold brewing coffee device which eliminates suspended solids in the production of the same. An inverted "P" trap in the piping allows the production of coffee by reducing suspended solids. In addition, the device uses a false bottom to hold coffee beans when water is delivered between an initial tank and a second tank, to produce the liquid coffee.

Design U.S. Pat. No. D899,182 shows a soaking basket which includes a number of vertical tiers, each having mesh side portions.

A beverage steeping apparatus for producing relatively large quantities of beverages, such as coffee, which is capable of operating without clogging, would be a notable advance in the brewing arts.

SUMMARY OF THE INVENTION

In accordance with the present invention a novel and useful beverage steeping apparatus is herein provided.

The apparatus of the present invention uses a vessel which possesses a chamber with an entry. The vessel is employed with conventional water and essence containing substances such as coffee grounds, tea leaves and like.

A screen unit is found in the apparatus of the present invention and is capable of supporting the substance for contact with water during extraction of the essence. The screen unit is positioned within the chamber of the vessel to allow access to the same by the substance and water. Such screen unit is constructed of a first screen layer which is formed of a woven screen material. A second screen layer is located beneath the woven screen. The mesh size of the second screen layer is predetermined to be finer than the mesh size of the woven screen of the first layer. Moreover, a third screen layer lies below the second screen layer and is also formed of a screen having a coarser mesh size than the second screen layer. In certain cases, the third screen layer may also be formed of a woven screen material.

A water dispersing element, which may be in a form of dispersion tray, uniformly delivers water to the screen unit in said chamber. The water dispersing element may be connected to a lid which is rotatable to cover and uncover the chamber of the vessel.

A perforated bottom support is positioned to lie immediately adjacent the screen unit, specifically below the third screen layer of the screen unit. The perforated bottom support serves as a mechanical prop for the screen unit and also allows the passage of the steeping product to travel to the bottom of the vessel.

The beverage steeping apparatus also includes a water level controller for maintaining a certain height of water in the chamber above the screen unit. The controller provides a predetermined water pressure, which is established to aid the passage of water through the substance lying on the screen unit. Again, a lid is also found in the apparatus of the present application and is rotatable to and away from the entry to the chamber. In addition, a pivoting element allows the tilting of the vessel itself once the lid is raised and rotated away from the entry to the chamber, in order to allow the empting of the spent contents from the screen unit.

It may be apparent that a novel and useful beverage steeping apparatus has been heretofore described.

It is therefore, an object of present application to efficiently provide a beverage steeping apparatus which is capable of producing an essence and water mixture, such as coffee, in relatively large quantities.

Another object of the present application is to provide a beverage steeping apparatus that utilizes a unique screen unit composed of multiple screens having varying mesh sizes to prevent clogging of the screen unit by wetted substances such as coffee grounds.

Another object of the present application is to provide a beverage steeping apparatus that includes a vessel capable of supporting the screen unit and which may be tilted or tipped to empty spent contents found on the screen unit.

Another object of the present application is to provide a beverage steeping apparatus which includes a screen unit formed of the screens having various configuration and sizes to allow the even dispersion of water containing the essence steeped from the substance without clogging of the screen unit by the saturated substance.

A further object of the present application is to provide a beverage steeping apparatus which employs water and essence containing substance in conjunction with multilayered screen units to separate the substance and extract the essence, in which the water level, of the certain predetermined amount, is maintain above the substance screen unit during the steeping process.

Another object to the present application is to provide a beverage steeping apparatus in which a screen unit is employed and provides horizontal liquid pathways for movements of the essence contained in water to ensure dispersion of the same in the steeping process.

Another object of the present application is to provide a beverage steeping apparatus which is capable of steeping or brewing coffee and tea.

Another object of the present application is to provide a beverage steeping apparatus which is capable of brewing or steeping hot or cold coffee.

The application possesses other objects and advantages especially as concerns particular characteristics and features thereof which will become apparent as the specification continues.

For better understanding of the application, reference is made to the following detailed description of the preferred embodiments thereof, which should be referenced to the prior described drawings.

DETAILED DESCRIPTION OF THE PREFERRED EMBODIMENT

Various aspects of the present application will evolve from the following detailed description of the preferred embodiments, which should be referenced to the hereinbefore described drawings.

Figure 1:
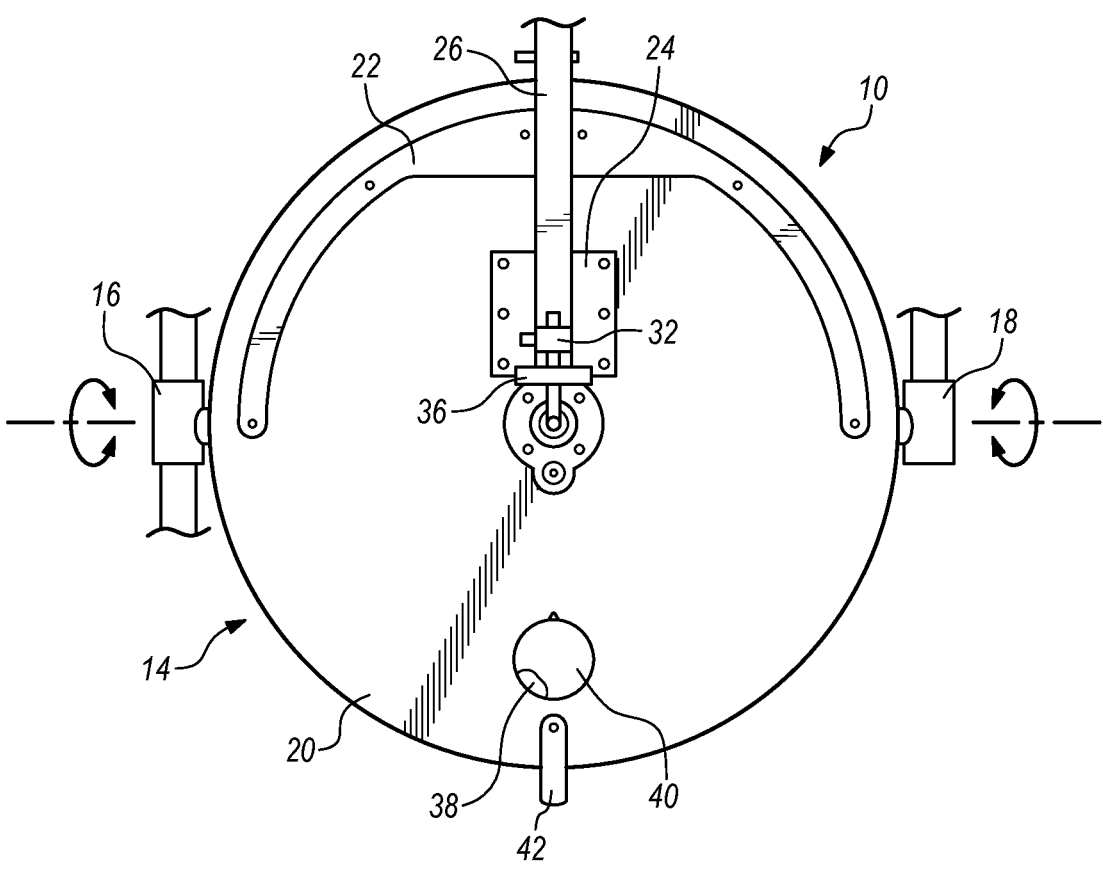
FIG. 1 is a top plan view of the unit of the apparatus of the present application.

The apparatus as a whole is shown in the drawings by reference character 10. The steeping unit 10 includes, as a one of its elements, a vessel 12 with a rotatable lid 14. It should be noted that vessel 12 is also rotatable about pivots 16 and 18, FIGS. 1 and 2. Lid 14 is formed with a circular plate body having a horseshoe shaped brace 22 and a connecting plate 24. Arm 26, in turn, is fastened to brace 22 and to connecting plate 26. Hydraulic pivot 28 is capable of rotating lid 14 forward and away from vessel 12, directional arrow 30. Water passing through inlet 32 delivers water to vessel 12. A water level detector or sensor 34 is also mounted to lid 14 and determines and controls the level of water within vessel 12.

For example, a sensor model No. LMT100 manufactured by ISM Electronics GMBH of Essen Germany will suffice in this regard. It should be noted that water passing from inlet 32 includes a valve 36 which is programmable and operates with water level detector sensor 34 and a conventional programmable logic controller (PLC) 81. Valve 36 may take the form of an angle body valve, Model No. VZXF Manufactured by Festo SE&CO KG of Esslingen, Germany.

Figure 7:
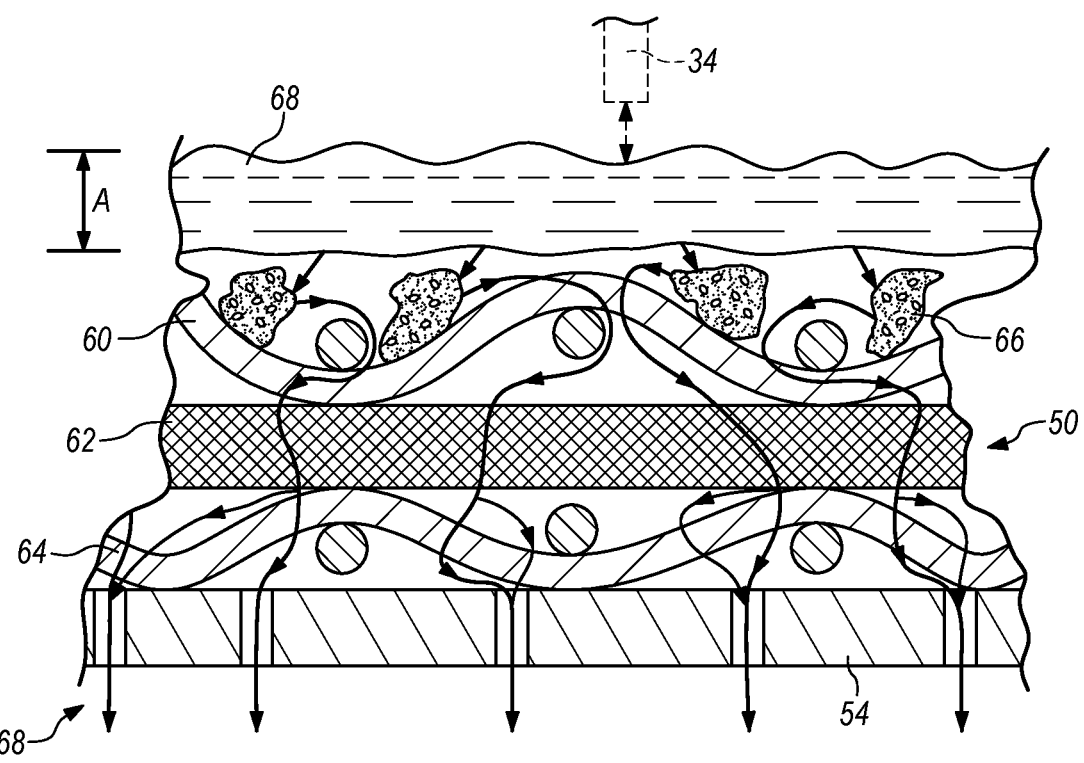
FIG. 7 is a partial schematic sectional view of the screen unit of the apparatus of the present application.

Of course other known automatic or manual water level controls may be used to maintain the water level in vessel 12, further discussed in reference to FIG. 7. Lid 14 also is provided with an access opening 38 with a removable cover plate 40. Tab 42 fastened to plate 20 of lid 14 permits user to manually open or close lid 14 of vessel 12.

Figure 3:
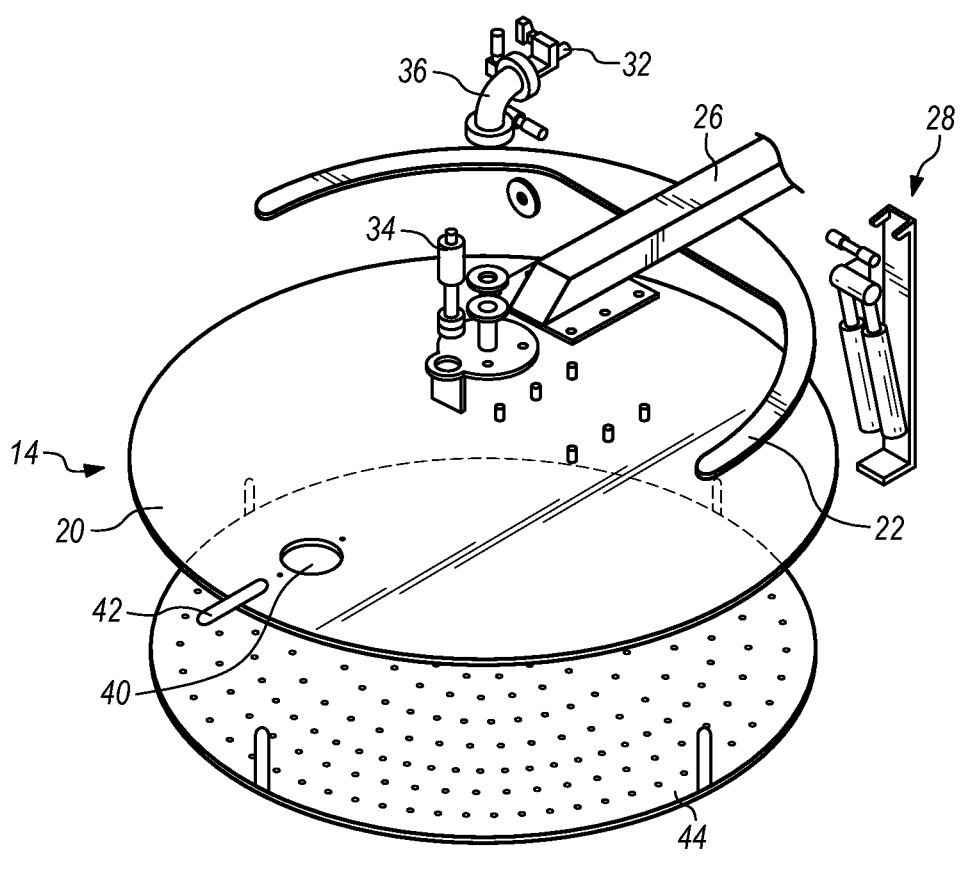
FIG. 3 is a top, right side, perspective view of the rotatable lid of the unit of the apparatus of the present application with a dispersion plate shown in the exploded configuration.
Figure 4:
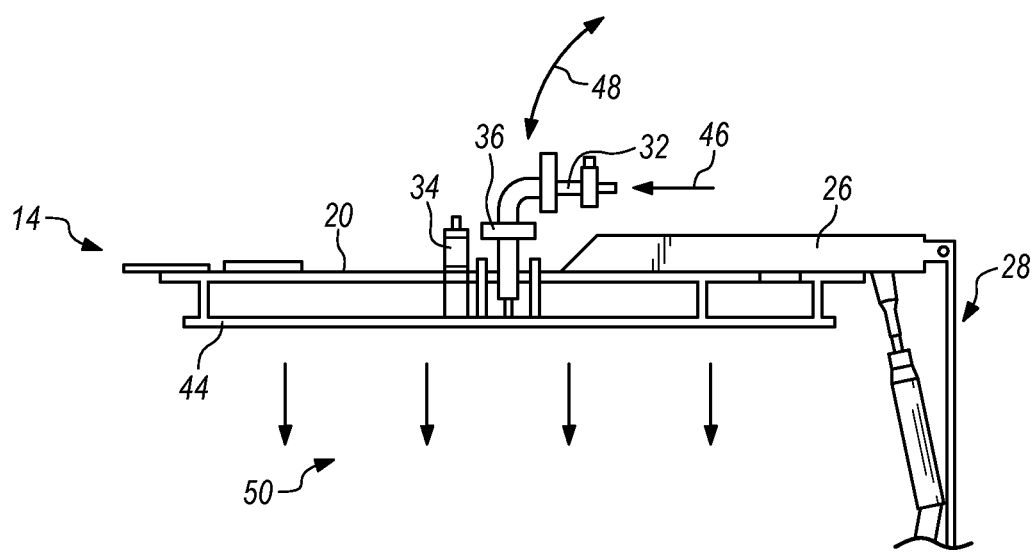
FIG. 4 is a side elevational view of the lid of the unit of the apparatus of the present application.

FIGS. 3 and 4 further detail the structure of lid 14 which additionally includes a dispersion plate or dispersing element 44 for evenly delivering water to inlet 32 through valve 36, directional arrow 46. It should be realized, that the rotation of lid 14, directional arrow 48 of FIG. 4, also rotates dispersing element 44, connected to plate 20 of the lid 14. Again, water passing from water inlet 32 and valve 36 is uniformly directed downwardly according to plurality of directional arrows 50, FIG. 4.

Figure 5:
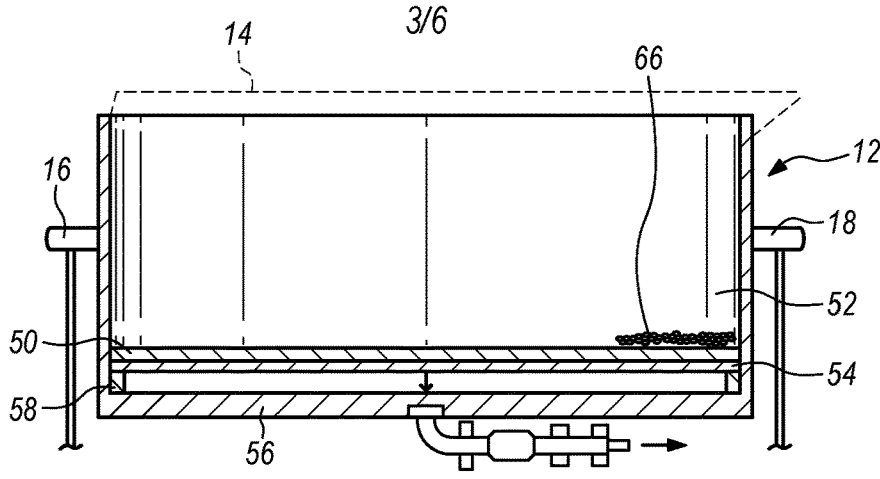
FIG. 5 is the sectional view taken along line 5-5 of FIG. 2.

Referencing now FIG. 5, it may be observed that vessel 12 possesses a screen unit 50. Screen unit 50 is supported within chamber 52 of vessel 12 by a perforated false bottom 54. False bottom 54 lies above the bottom 56 of vessel 12 by standoff 58.

Figure 6:
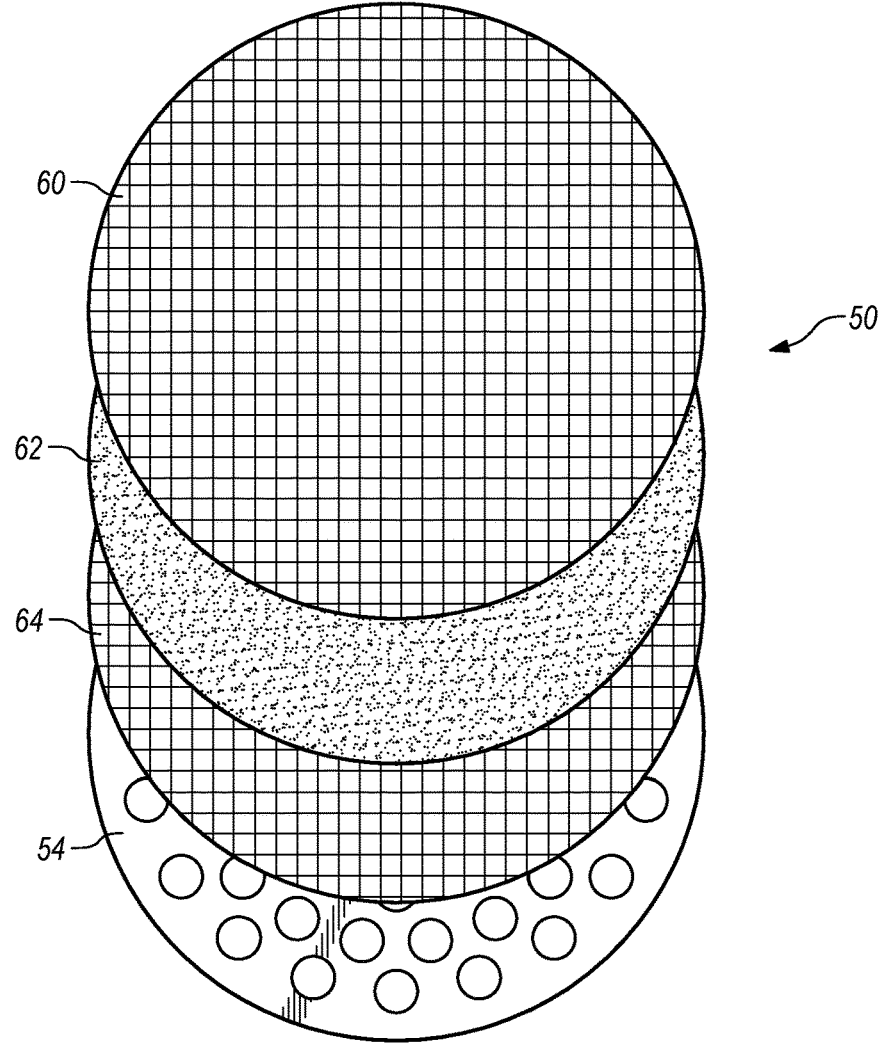
FIG. 6 is an exploded view of the elements of the screen unit of the apparatus of the present application.

FIG. 6 provides further details of screen unit 50 and perforated false bottom 54. Screen unit 50 is constructed of a first screen layer 60 which is preferably fashioned of a woven metallic material. The preferred mesh size of first screen layer 60 ranges between 10 and 20 mesh and, ideally, lies in or about 15 mesh. Beneath first screen layer 60 is a second screen layer 62 which is of a finer mesh size than woven screen layer 60. Second screen layer possesses a mesh size which ranges between 35 and 80 mesh. Second screen layer 32 may possess a preferred size of about 40 mesh and is used to capture fines. Third screen Layer 64 lies below second screen layer 62 and is of a larger mesh size than second screen layer 62. Third screen layer 64 is of a coarser mesh size than second screen layer 62 and may range between 10 and 20 mesh. This screen layer 64 may be formed of a woven screen material, as this the case with first screen layer 60. It has been found that this combination of first, second, and third screen layers allows the substance containing an essence, such as coffee grounds 66, FIG. 5, to sit on first screen layer 60 and permit the steeping process to occur without clogging of screen unit 50, specifically, the clogging of second screen layer 62 of relatively fine mesh. Screen unit 50 produces steeped liquid at a relatively fast rate compared to prior art devices.

FIG. 7 illustrates, schematically, the production of coffee by the movement of water 68 through screen unit 50 and false bottom 54 within chamber 52 of vessel 12. As may be apparent, water 68 passes to exemplar coffee grounds 66 located on first screen layer 60 where the essence from coffee grounds 66 is steeped in a form of liquid coffee. Liquid coffee then passes through first screen layer 60 and moves downwardly toward second screen layer 62 of fine mesh, but travels at least partially in a generally horizontal direction. This path of travel prevents the clogging or gathering of coffee grounds 66 by dispersing fine particles from the steeping process horizontally along first screen layer 60. After passing through second fine mesh layer 62, coffee flows to third screen layer 64 is again dispersed evenly in the horizontal direction along third screen layer 64 before exiting perforated false bottom 54, for passage to the bottom 56 of vessel 12, FIG. 8. Plurality of directional arrows 68 on FIG. 7 are intended to illustrate the downward and lateral movement of liquid as water 68, delivered by dispersing unit 44, through screen unit 50, and to false bottom 54. It should be noted that water body 68 is maintained at the level above coffee grounds 66 shown resting upon first screen layer 60 of FIG. 7. As stated, sensor 34 control valve 36, and programmable logic controller (PLC) provide and maintain this "head" of water during the steeping process. Water body 68 exerts a desired pressure on coffee grounds 66 to aid in the steeping process.

Figure 8:
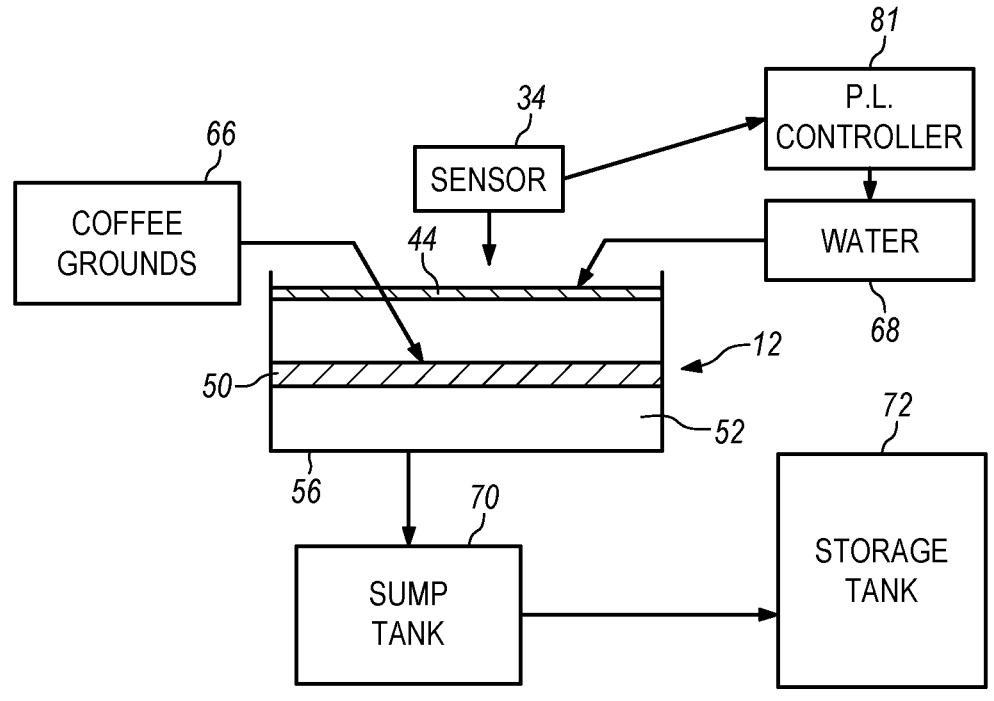
FIG. 8 is a block diagram illustrating the process of producing coffee utilizing the apparatus of the present application.

FIG. 8 shows the general steeping process for coffee utilizing device in which water is delivered to dispersing element 44 and to the bottom 56 of vessel 12, within chamber 52 of the same. When a sufficient amount of coffee is produced, it is sent to a sump tank 70 and, later, transferred to a storage tank 72.

Figure 9:
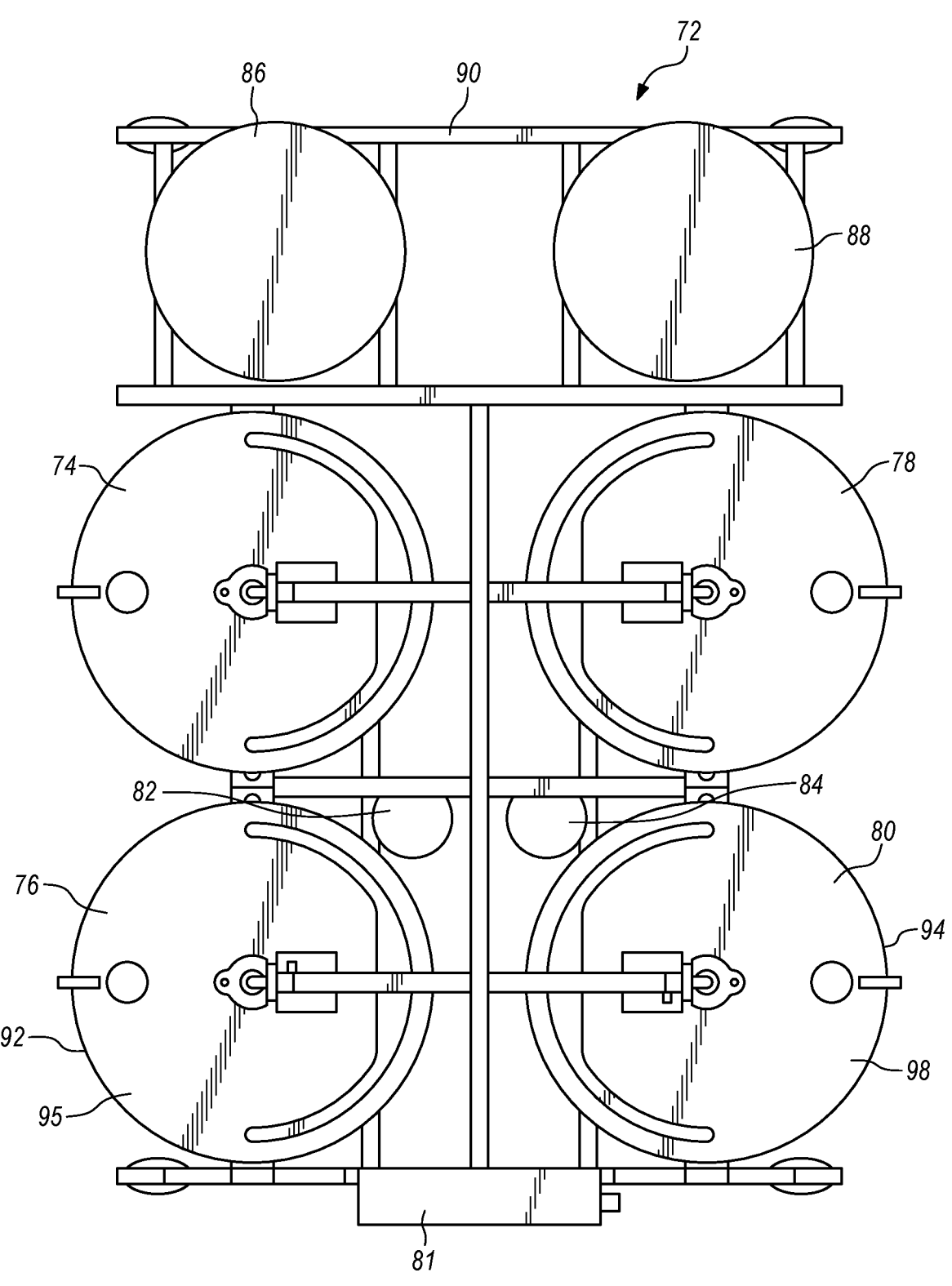
FIG. 9 is a top plan view showing an apparatus of the present application employing a quartet of units to steep a beverage.
Figure 10:
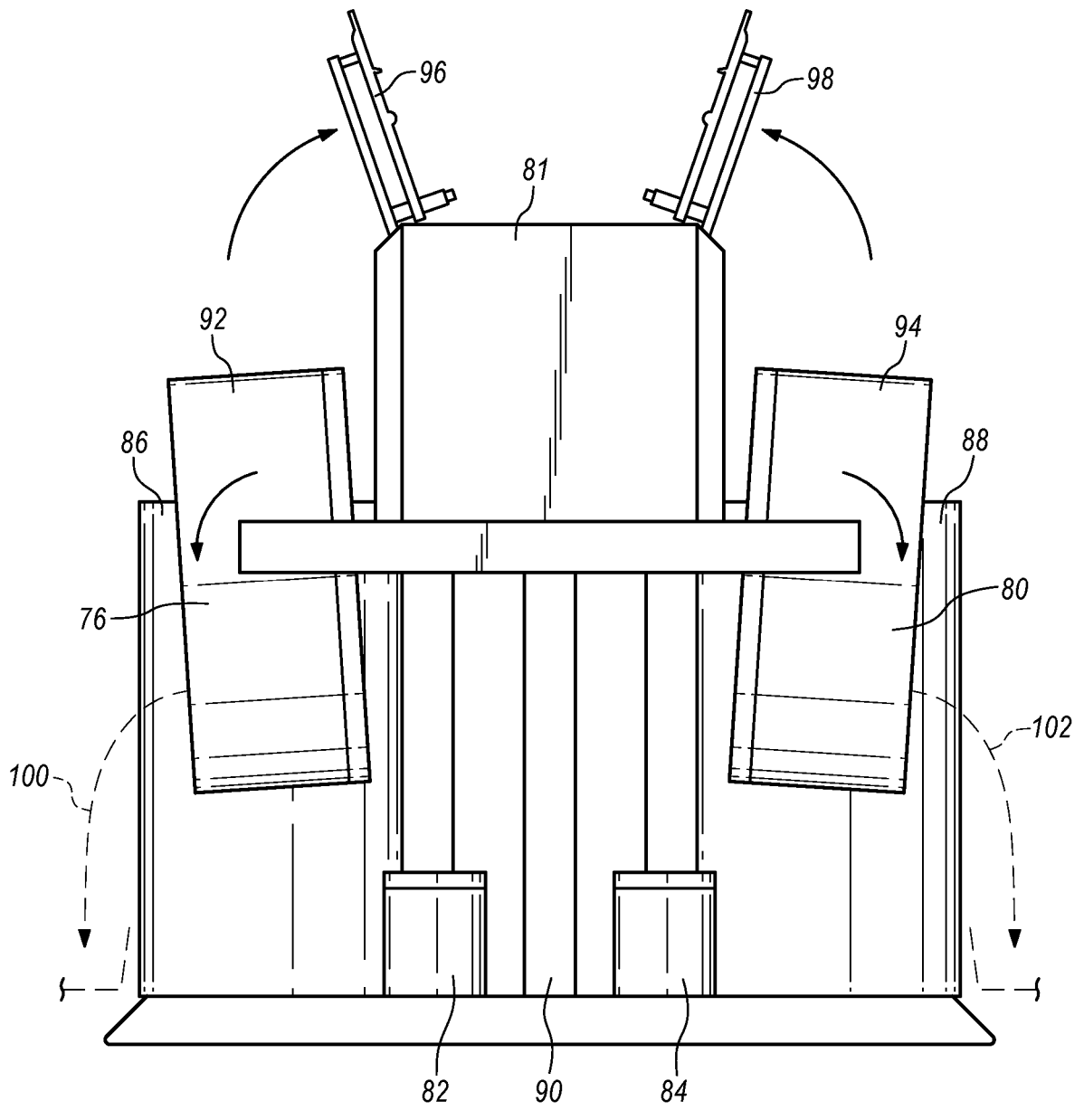
FIG. 10 is an end view of the apparatus of FIG. 9 illustrating the tilting of the lids of the units and the tipping of the vessels of the units.

FIG. 9 illustrates a steeping apparatus 72 which is formed of multiple steeping units 74, 76, 78 and 80, each of which is identical to the steeping unit 10 shown and described in FIGS. 1-7. A controller 81 in the form of a conventional programmable logic controller (PLC) regulates the movement of liquid from steeping units 74, 76, 78 and 80 to sump tanks 82 and 84 as heretofore described. Steeped liquid from sump tanks 82 and 84 is passed to storage tanks 86 and 88. A frame 90 supports steeping units 74, 76, 78 and 80, sump tanks 82, 84 and storage tanks 86 and 88. FIG. 10 illustrates the tilting of vessels 92 and 94 of steeping units 76 and 80 as well as the partial upward movements of lids 96 and 98, thereof. Of course, the vessels and lids of steeping units 74 and 78, FIG. 9, would operate in a similar manner. Once tilted, vessels 92 and 94 may be emptied according to directional arrows 100 and 102. A cart or similar item would accept the spent grounds from vessels 92 and 94.

Figure 2:
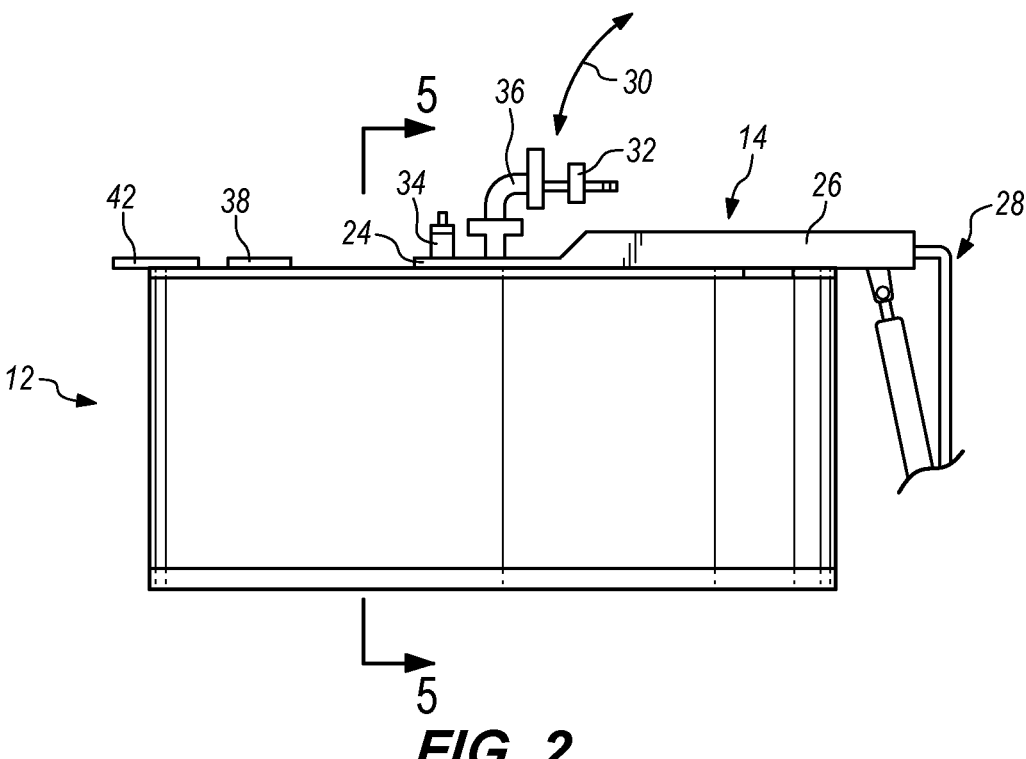
FIG. 2 is a side elevational view of the unit of the apparatus of the present application.

In operation, the user rotates lid 14 of steeping unit 10 upwardly according to directional arrows 30 of FIG. 2. The substance, such as coffee grounds, is placed on screen unit 50, specifically atop screen layer 60 of screen unit 50. Lid 14 is then closed and water is passed into vessel 12 of steeping unit 10 via inlet 32, control valve 36, and PLC of controller 81. Sensor 34 detects the level of water above the screen layer 60 and maintains a liquid head above the coffee grounds 66 placed atop first screen layer 60. For example, the water level may lie at about 2 to 3 cm above coffee grounds 66 atop first screen layer 60. Controller 81, in the form of a programmable logic controller (PLC), acts in accordance with valve 36 and sensor 34 to maintain this level of water 68 throughout the steeping process. The unique combination of screen layers 60, 62 and 64 spreads the steeping process across the screen unit 52 without clogging the same. Steeped liquid, such as coffee, passes through perforated false bottom 54 to the bottom 56 of vessel 12. After a certain quantity of steeped liquid, such as coffee, is created, it is directed to a sump tank 82 and then to the storage tank 86. Of course, the pumping between vessel 12 and sump tank 82 and storage tank 86 is of conventional configuration and may be operated manually or automatically by known mechanisms.

WORKING EXAMPLE

The steeping unit 10 device of FIGS. 1-6 was assembled for use. The capacity of vessel 12 was about 183 liters. Approximately, 34 kilograms of coffee grounds were loaded into screen unit 50 and 68 kilograms of water was delivered to the grounds dispersing element 44. During steeping, a level of water above the ground was maintained at 2.5 cm by sensor 34 and valve 36 in conjunction with the conventional PLC. After about (2) hours a sufficient amount of high quality coffee was obtained, without any clogging of screen unit 50, and transferred to storage.

What is claimed is:

1. A beverage steeping apparatus employing water and an essence containing substance to produce a steeped liquid, comprising:

a vessel, said vessel comprising an air chamber and an air entry to said chamber;

a screen unit, said screen unit being capable of supporting said substance for contact with water for extraction of an essence, said screen unit being positioned in said chamber of said vessel;

said screen unit comprising a first screen layer formed of a woven screen, said first screen layer configured to hold the essence containing substance and to allow steeped liquid to move downwardly and at least partially in a generally horizontal direction along said first screen layer;

said screen unit further comprising a second screen layer located completely beneath said woven screen of said first screen layer, said mesh size of said second screen layer being finer than said mesh size of said woven screen of said first screen layer, said second screen layer being configured to allow passage of said steeped liquid;

said screen unit further comprising a third screen layer lying completely below said second screen layer, said third screen layer being a woven screen of a coarser mesh size than said second screen layer, said third screen layer being configured to allow passage of said steeped liquid to travel downwardly and at least partially in a lateral direction along said third screen layer relative to said downward pressure, said first, second, and third screen layers being unconnected to one another and said first woven screen layer being separated from said third screen layer;

said vessel further comprising a perforated false bottom beneath said third screen layer and a bottom beneath said false bottom;

said vessel further comprising a sump tank beneath said bottom;

a water dispersing element for delivering water to said vessel unit in said chamber at a level above said essence containing substance supported on said first screen layer, and continuously moving water downwardly through said screen unit, said water dispersing element comprising a perforated dispersion plate, receiving water from a water inlet and through a valve;

a water level controller for maintaining a certain height of water above said entire screen unit and creating a head of water exerting downward pressure upon the essence containing substance supported on said first screen layer, said screen unit further configured to allow the steeped liquid to travel downwardly through said screen unit and at least partially in a lateral direction along said first screen layer of said screen unit, relative to said downward head pressure of said water exerted upon the essence containing substance supported on said first screen layer, said water level controller having a sensor and a control valve operated by a programmable logic controller; and said downward movement of said steeped liquid via said screen unit continuously passing through said false bottom, simultaneously with said continuous moving of water through said screen unit to said bottom of said vessel, and to said sump tank beneath said bottom of said vessel;

said vessel further comprising a pivoting element to tilt said vessel.

2. The apparatus of claim 1 in which said mesh size of said first screen layer size ranges between 10 and 20 mesh.

3. The apparatus of claim 2 in which said second screen layer size ranges between 35 and 80 mesh.

4. The device of claim 1, which additionally comprises a lid for said vessel, said lid being rotatable towards and away from said entry to said chamber.

5. The apparatus of claim 1 in which said second screen layer size ranges between 35 and 80 mesh.

\* \* \* \* \*